United States Patent Office 2,907,746
Patented Oct. 6, 1959

2,907,746

HYDROXYARYL ALIPHATIC ACID POLYURETHANES

Sylvan O. Greenlee, Racine, Wis., assignor to S. C. Johnson & Son, Inc., Racine, Wis.

No Drawing. Application January 16, 1957
Serial No. 634,423

7 Claims. (Cl. 260—47)

This invention relates to novel resinous compositions of matter of the polyurethane type and is directed more particularly to synthetic resinous compositions derived from the reaction of hydroxyaryl aliphatic acids with polyisocyanates.

One of the objects of this invention is to provide a new class of synthetic resinous compositions which are capable of further reaction to give infusible, insoluble materials suitable for use as protective coatings, adhesives, and molding resins.

A further object is the synthesis along the general lines of known reactions of a film-forming product characterized, by virtue of the novel reactants from which it is derived, with improved properties especially as regards resistance to attack by common chemicals, resistance to wear or damage, and resistance to penetration and solvent action by water.

By suitable adjustment of the conditions of the reaction and the ingredients, the product of the invention may be caused to assume a cellular or foam state, and, accordingly, an additional aim of the invention is the provision of light-weight three-dimensional solids possessing good structural strength and, therefore, useful in load-bearing applications.

These and other objects are accomplished by the present invention which contemplates the reaction of a substantial amount of an isocyanate or isothiocyanate, at least half of which must contain two or more isocyanate or isothiocyanate groups per molecule, with an aliphatic acid, having a total of at least five carbon atoms with a single carbon atom being substituted with two hydroxyaryl groups.

It has been found that the reaction of hydroxyaryl aliphatic acids with polyisocyanates is an unusually advantageous mechanism for obtaining polymeric resinous compositions characterized by excellent protective coating and adhesive properties when used as a film, and high structural strength when cast into foam resin bodies. The hydroxyaryl aliphatic acids are especially adapted for the reaction by virtue not only of the presence in each molecule thereof of a plurality of functional groups reactive with the isocyanates, but because of the novel combination of hydroxyl and carboxyl radicals that make up this plurality of groups. As will be explained more fully, both hydroxyl and carboxyl radicals condense with an isocyanate group and, thus, are of value in forming a resinous product; in addition, the carboxyl radical in the condensation liberates carbon dioxide which can be utilized in producing foam resin structures. Hydroxyaryl aliphatic acids are high melting, cyclic compositions of unique symmetrical structure and tend to contribute to the reaction product such properties as outstanding chemical resistance and superior hardness and toughness. Chemical resistance is, for example, of great value in the formulation of protective coatings which are likely to be subjected in the course of ordinary usage to contact with various chemicals. The presence in the resin of residues having a symmetrical structure results in a more rigid product, a feature of much advantage in polyurethane foams.

The hydroxy-aryl aliphatic acids contemplated for reaction according to this invention may be, and preferably are, prepared by condensing a phenolic compound with a keto-acid under such conditions that two hydroxy-aryl radicals are attached to the same carbon atom of the acid. In order for the yields of this reaction to achieve useful levels, it is necessary, first, that the keto-carbon atom occur at the position adjacent a terminal methyl group, and second, that the keto-acid have at least five carbons in the aliphatic chain. The keto-acid of this type which has only four carbon atoms, aceto-acetic acid, is highly unstable under the conditions necessary for the reaction and does not produce the desired product. The five-carbon acid, levulinic acid, gives excellent yields. Higher acids are apparently useful, but these exist principally as laboratory curiosities and are not available in commercial quantities. There is disclosed in prior co-pending applications, Serial Nos. 464,607 and 489,300, filed October 25, 1954, and February 18, 1955, respectively, a number of illustrative acids that have been found to be particularly suitable for use, as well as methods of preparing the same. These acids consist of the condensation products of levulinic acid and phenol, substituted phenols, or mixtures of phenol and substituted phenols and shall, for the sake of brevity, be referred to herein as "the Diphenolic Acid."

The term "substituted phenols" is used herein to embrace phenols and phenolic compounds wherein one or more hydrogen atoms of the phenyl nucleus is replaced by an atom or group that does not enter into, or otherwise interfere with, the condensation of the compound with the keto-acid. Thus, for example, the nucleus may be alkylated with a methyl or other alkyl group, preferably having not more than five carbon atoms, as disclosed in the aforementioned application, Serial No. 489,300, or halogenated with bromine, fluorine, chlorine, or combinations thereof, provided that the total number of substituents, including hydroxyl groups, does not exceed three. The Diphenolic Acid derived from substituted phenols, such as the alkylated phenols, is sometimes more desirable than the products obtained from unsubstituted phenols since the alkyl groups tend to provide better organic solvent solubility, flexibility, and water-resistance, as well as influencing the nature and extent of subsequent reactions for which the acids are adapted. However, the unsubstituted product is usually more readily purified.

The other component of the reaction of the present invention is an isocyanate or isothiocyanate compound. In order that a resinous product be obtained, the isocyanate or isothiocyanate compound must contain two or more isocyanate or isothiocyanate groups, a plurality of functions being essential if a chain or cross-linked structure is to be developed by condensation with the functional groups of the Diphenolic Acid. Accordingly, the principal reaction contemplated herein may be described as between a Diphenolic Acid and a polyisocyanate having the general formula $R(NCX)_z$, where X is a chalcogen having an atomic weight less than 33, i.e., oxygen or sulfur; z is an integer of more than one; and R is a polyvalent organic radical with the number of valences being equal to z. There are numerous compounds coming within this formula that are suitable for the reaction and no attempt will be made to give an exhaustive list. The following are considered illustrative and will suggest to the expert a variety of others: alkylene diisocyanates; such as ethylene diisocyanate, trimethylene diisocyanate, tetramethylene diisocyanate, hexamethylene diisocyanate, decamethylene diisocyanate, and their corresponding sulfur analogues; cyclo-alkylene diisocyanate, such as cyclopentylene diisocyanate, cyclohexylene diisocyanate, and their corresponding sulfur analogues; aromatic diisocyanates, such as m-phenylene diisocyanate, naphthalene diisocyanate, diphenyl-4,4′-diisocyanate, and their corresponding sulfur analogues; aliphatic-aromatic diisocyanates, such as xylene-1,4-diisocyanate, diphenylene methane diisocyanate and their corresponding sulfur analogues; hetero-, diiso- and diisothiocyanates, such as $SCNCH_2OCH_2NCS$ and $SCNCH_2SCH_2NCS$; and isocyanates and isothiocyanates having more than two isocyanate or isothiocyanate groups, such as benzene 1,2,4-triisocyanate, 1,2,2-triisocyanatobutane, and toluene triisocyanate. From among these and other polyisocyanates and polyisothiocyanates, the following are preferred largely by reason of their ready commercial availability: toluene 2,4 diisocyanate, toluene 2,6 diisocyanate, methylene bis (4-phenyl isocyanate), 3,3′ bitolylene 4,4′-diisocyanate, and hexamethylene diisocyanate. In order to simplify the remainder of the discussion, the repetitious recital of both the oxygen and sulfur forms will be dispensed with; only the oxygen compound will be given but will be understood as embracing the corresponding sulfur analogue.

While, as has already been mentioned, the principal reaction requires a polyisocyanate compound, it is desirable for certain applications to modify the product by using, in addition, a minor portion of a monoisocyanate. Many of the reaction products of Diphenolic Acid with polyisocyanates alone are brittle infusible products; on the other hand, flexible infusible products may be obtained by the addition to the reaction mixture of a proper amount and type of monoisocyanate. Examples of suitable monoisocyanate are octadecylisocyanate, hexyl isocyanate, to mention just a few of the simpler compounds. Flexibility is particularly apparent where long-chain compounds, i.e. having more than 11 carbons, are employed. Unsaturated monoisocyanates are also suitable and provide an additional aid to conversion or curing. The amount of the mono-compound that is added to the acid and polyisocyanate as a modifier will vary depending upon the characteristics desired in the product. As a general rule, there should be present a greater amount of the poly-compound than the mono-compound, which is to say, that the monoisocyanate should be less than 50% of the total of all isocyanates in the reaction mixture. If a more rigid, brittle material is sought, the quantity of the mono-form should be decreased while, if more flexibility is the desideratum, it should be increased toward the upper limit just mentioned. The functional group of the mono-form reacts with the carboxyl or phenolic hydroxyl groups of the acid to reduce cross-linking within the polymer chain and thereby enhance the softness and pliability of the polymer in proportion to the amount present, or a functional group of each of two molecules of the monoisocyanate may react with two of the functional groups of a single molecule of acid and, thus, terminate the chain.

The chemistry of the present reaction appears to be reasonably straightforward. It is well known that isocyanates react with both phenolic hydroxyl groups and carboxylic acid groups. The reaction of a diisocyanate, $R'(NCO)_2$, with a phenolic hydroxyl group, such as that in phenol, proceeds in the following manner:

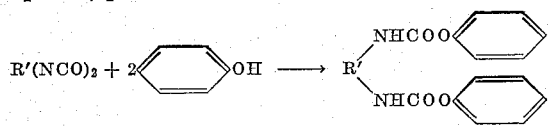

In similar fashion, the reaction between a diisocyanate and a carboxylic acid, RCOOH, is as follows:

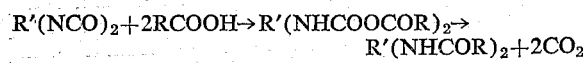

It will be seen that, if the phenolic compound contains two hydroxyl groups or if the carboxylic acid contains two acid groups, the resulting product in either case would be polymeric. Likewise, it will be observed that if a compound is used containing both carboxyl groups and phenolic hydroxyl groups, there is the possibility of simultaneous reaction of both with the isocyanate to give polymeric compounds. It will also be observed that the reaction with a carboxyl-containing compound gives, as a by-product of the reaction, carbon dioxide which may be used to form cellular structures in those reaction products which are intended to be three-dimensional structures.

Applying these general considerations to the reactants proposed herein, a Diphenolic Acid and a polyisocyanate $R(NCO)_2$, it will be appreciated that the directions in which the reaction might go are too varied to be readily illustrated. An isocyanate residue may bridge phenolic hydroxyl groups of two acid residues, carboxyl groups of two residues, or the hydroxyl group of one and the carboxyl group of another residue. Since there are three functional groups to each residue, according to the law of permutations, there are six ways in which these three can combine with any other three groups. This, of course, presumes the presence of adequate quantities of the isocyanate to satisfy all of the reactive groups of the acid. Where this condition is not true, additional possibilities exist dependent upon the actual amounts of isocyanate available for reaction and the distribution of the isocyanate molecules among the acid molecules. The choice of relative proportions of acid and polyisocyanate is dictated principally by the nature of the ultimate product to be obtained. Experience has indicated that a product having useful characteristics attributable to both reactants is obtained generally at a ratio of equivalent weights of acid to polyisocyanate within the range of 1:5 to 5:1. From a consideration of the reaction, it will be understood that the optimum situation prevails where all of the functional groups of the acid are reacted with the functional groups of the polyisocyanate. For this reason, a preferred range is 2:1 to 1:2 of acid to isocyanate on equivalent basis with a 1:1 ratio being most desired. As a general rule, it can be postulated that as the proportion of acid is increased, the polymer becomes more brittle, rigid and hard while, conversely, as the proportion of isocyanate is increased, the polymer becomes more flexible, this being particularly true where the functional groups of the isocyanate are separated by fairly long chains so that the acid nuclei are spaced relatively large distances apart within the molecule of the polymer, which thus assumes a more or less linear configuration. On the other hand, where the isocyanate is of a tightly knit, cyclic structure, the tendency is toward enhanced rigidity and brittleness.

If a monoisocyanate is employed along with the polyisocyanate, the number of reactive foci of the Diphenolic Acid available to the functional groups of the polycompound is lessened. In arriving at the amounts of reactants to be utilized, the mono-compound must therefore be considered, and in such case the equivalent weight of the isocyanate is the total of the equivalent weights of the mono- and poly-compounds.

In general, the procedure by which protective coating films are prepared in accordance with the present invention involves merely the addition at ordinary temperatures of the Diphenolic Acid to the isocyanate, forming a film of the desired thickness of the mixture, and converting the mixture by exposure either to normal temperatures or to heat. In some cases, it is desirable to dilute either or both of the reactants, e.g., to lower the viscosity of the mixture and, thus, vary the film thickness of a single coat. Any solvent that is inert to both the acid and isocyanate may be used, an example being methyl ethyl ketone among many others. The mixture of reactants, either diluted or not, has been found to be quite stable for moderate periods of time at normal temperatures. Such stability is a feature of considerable importance as it permits large quantities of the mixture to be made up at one time and then used as needed. For heat cure, temperatures of about 80–175° C. for times of about one hour to about five minutes have been found satisfactory. For a normal temperature cure, it is preferred that any of the well known conversion catalysts for reactions of this type, such as triethanolamine, be added in small amounts in order to reduce the amount of time needed for the film to harden. When early conversion is of no special advantage, the catalyst may be dispensed with. As the examples show, the characteristics of the cured films vary somewhat with the type and amount of the isocyanate employed, with some being better than others, as would ordinarily be expected. As a whole, however, the films possess characteristics that compare favorably with many other available materials so that the product of the invention is quite useful for a variety of purposes.

Where solid foam or cellular structure are desired, they may be obtained by mixing the Diphenolic Acid, which is heated to its melting point or slightly above if not already fluid, with a suitable conversion catalyst, of which triethanolamine is again an example, in an appropriate reaction vessel, adding the isocyanate while agitating, allowing the mixture to foam unimpeded, and converting by heating, as in a draft oven, at a temperature of about 80–175° C. or more for from about 5–30 minutes, or by normal temperatures for much longer periods. Although not essential, it is usually desirable to employ an emulsifier in order to obtain a more homogeneous mixture of the reactants. The instant process may be carried out readily in any system which provides for stirring and has sufficient space for the foaming action to proceed unhindered. A modification of a unit currently used in commercial urethane foam production may also be employed. Such a system comprises two supply tanks connected to a pressure-mixing nozzle by suitable feed lines. One tank, which may have to be heated contains the isocyanate and the other tank contains the Diphenolic Acid emulsified with the emulsifying agent and catalyst. The acid and isocyanate are fed from the tanks to the nozzle where they are mixed under pressure and flowed into pans where the foaming reaction is allowed to proceed unhindered. Again, the foams may be cured in a suitable draft oven at elevated temperatures, thus accelerating the operation. Although the foams may be cured by exposure to normal temperatures as in the case of the films, this considerably prolongs the curing time and a heat cure is preferred.

As has already been briefly mentioned, the Diphenolic Acid lends itself especially well to the formation of urethane foams by reason of the carboxyl group which it contains. This group in the course of the reaction decomposes to form gaseous carbon dioxide which bubbles through the mixture to produce a cellular structure. Thus, a foaming medium is inherently present, eliminating the need, in many instances, of an external foaming agent. This is not to say that the use of other foaming agents, such as water, to assist in the foaming action is precluded entirely as it sometimes proves advantageous to add small amounts of water, say up to about 5% by weight of the mixture. The use of water merely as an assistant does not add unduly to the curing time of one hour or less which is in distinct contrast to typical present commercial polyurethane foam processes, wherein water is used as the sole foaming agent, which require a post-cure of some 24 hours' duration. The density of the foams made as described herein varies not only with the particular isocyanate selected for reaction but with the temperature of the conversion as well. It has been found that as the temperature of this stage is increased, the density of the foam also increases, due presumably to the increased loss of $CO_2$ from the mixture at the higher temperatures.

The toughness and rigidity contributed by the Diphenolic Acid are especially significant in the case of foam structures which have, in the past for the most part, been of rather soft, spongy texture. These characteristics, together with the resistance to water and common chemicals that the present foams exhibit as well as a very low density when compounded to this end, constitute a rather exceptional combination in this field, so that the present invention should be particularly valuable in producing foam solids for such uses as air domes, insulation, crash linings for vehicles, aircraft, etc., and structural components alone or in conjunction with outer coverings of wood or metal.

The following are Diphenolic Acids, and a method by which each may be prepared, representative of those that may be used in this invention, parts being by weight:

(1) *Condensation product of levulinic acid and phenol.*—A mixture consisting of 376 parts of phenol, 116 parts of levulinic acid, and 250 parts of 37% aqueous hydrochloric acid was agitated at 48–52° C. for 66 hours. The upper organic layer was removed from the aqueous HCl for decantation. The product was then purified by vacuum distillation of the volatile unreacted materials by heating to 180° C. at 32 mm. pressure. The residual product amounted to 247 parts (86.5% of theoretical) having a softening point of 80° C. and an acid number of 155. Purification of this product by first dissolving in aqueous bicarbonate solution, reprecipitating with mineral acid, followed by recrystallization from hot water gives a white crystalline compound melting at 171–172° C., having an acid value of 196 with an isocyanate equivalent of 89.7, 94% of theoretical.

(2) *Condensation product of levulinic acid and meta-cresol.*—A mixture of 378 parts (3.5 mols) of meta-cresol, 116 parts (1 mol) of levulinic acid, and 250 parts of 37% aqueous hydrochloric acid was agitated at 50° C. for 72 hours. The upper organic layer was removed from the aqueous HCl decantation. The product was then purified by vacuum distillation of the volatile unreacted materials by heating to 170° C. at 30 mm. pressure. The residual product has an acid number of 166 (theoretical for the pure Diphenolic Acid=178). The yield amounted to 184 parts (58.6% of theoretical). The isocyanate equivalent was 198.

(3) *Condensation of levulinic acid and a mixture of phenol and ortho-cresol.*—Similar treatment of a mixture of 3.5 mols of a technical cresol containing 40 parts phenol and 60 parts ortho-cresol, 1 mol of levulinic acid, and 250 parts of 37% hydrochloric acid gave 275 parts (90.5% of theoretical) of a product having an acid number of 149. The isocyanate equivalent was 235.

(4) *Condensation of levulinic acid and xylenol.*—Similar treatment of a mixture of 3.5 mols of a technical xylenol, a cresylic acid supplied by the Koppers Company, Inc., under the trade name X-2 which contains 95% xylenols of which about 30% is 3,5-xylenol and has a distillation range at the 5% point of 214–217° C. and at the 95% point of 220–225° C., 1 mol levulinic acid, and 250 parts of 37% hydrochloric acid reacted at 50° C. for 96 hours gave a product having an acid number of 166 in yields of around 50% of the theoretical amount. The isocyanate equivalent was 168.

It will be observed that an isocyanate equivalent is specified for each acid. The isocyanate equivalent is defined as the weight of the acid which will react with one equivalent of the isocyanate and will be of assistance in selecting actual amounts of the acid that should be used. The method used in determining the observed values as listed involves reacting a sample of the acid with an excess of toluene-2,4-diisocyanate and then determining the excess isocyanate by reaction with di-n-butylamine. Specifically, the technique used is as follows:

To 25 ml. of methyl isobutylketone is added 3 grams of toluene-2,4-diisocyanate previously standardized against di-n-butylamine and a weight of the acid such that the diisocyanate is present in approximately 100% excess. To this mixture is added triethylamine in an amount equal to 1% of the total weight of isocyanate and the acid. The mixture is refluxed for a period of one hour. After cooling to room temperature, the condenser walls are rinsed with about 25 ml. of redistilled toluene. To this mixture is added 25 ml. of 2 N di-n-butylamine. This mixture is warmed to the boiling point, allowed to stand for one hour at which point 75 ml. of methanol is added, and the excess di-n-butylamine back-titrated with 1 N alcoholic hydrochloric acid. By carrying out the preparation of the acids with great care, values at or approaching the theoretical can be achieved.

The acid number given for each acid has its usual meaning, which is the number of milligrams of potassium hydroxide necessary to neutralize the acid content of a one gram sample, and provides an indication of the degree of acidity of the product.

The following table lists a group of mono- and polyisocyanates, considered to be representative of those operative herein, which were employed in the working examples of the invention hereinafter set forth:

TABLE I—REPRESENTATIVE ISOCYANATES

| No. | Commercial source, trade name, and abbreviation | Structure | Amine equivalent Observed | Amine equivalent Theory |
|---|---|---|---|---|
| 1 | E. I. du Pont de Nemours & Co., Inc.; Hylene T; Hy T. | 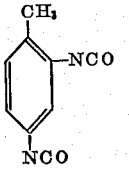<br>Toluene-2,4-diisocyanate | 90.62 | 87.07 |
| 2 | E. I. du Pont de Nemours & Co., Inc.; Hylene M; Hy M. | 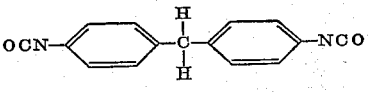<br>Methylene bis(4-phenyl isocyanate) | 139.98 | 125.12 |
| 3 | National Aniline Div.; Nacconate 200; N 200 | 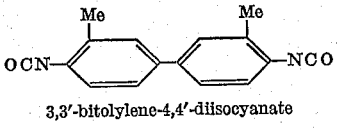<br>3,3'-bitolylene-4,4'-diisocyanate | 132.78 | 132.13 |
| 4 | Mobay Chemical Co.; Mondur N5; MO N5 | 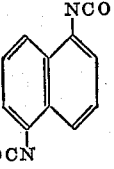<br>Naphthylene-1,5-diisocyanate | 116.58 | 105.09 |
| 5 | Mobay Chemical Co.; Mondur TM; MO TM | 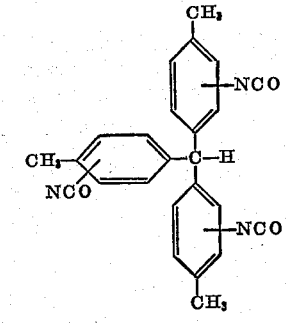<br>Triphenylmethane triisocyanate | 107.78 | 123.45 |
| 6 | Mobay Chemical Co.; Mondur HX; MO HX | OCN(CH$_2$)$_6$NCO<br>Hexamethylene diisocyanate | 103.39 | 84.01 |
| 7 | Mobay Chemical Co.; Mondur O; MO O | CH$_3$(CH$_2$)$_{17}$NCO<br>Octadecylisocyanate | 342.32 | 295.0 |
| 8 | Shell Development Co.; Durenediisocyanate; Dur | 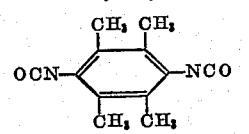<br>2,3,5,6-tetramethyl-1,4-benzene diisocyanate | 111.22 | 108.12 |

It will be noted that an observed and theoretical amine equivalent is specified for each isocyanate. The amine equivalent refers to the weight of the isocyanate containing one isocyanate group and reacting with one mole of di-n-butylamine. Since the isocyanates available commercially are not necessarily chemically pure, the observed values were obtained for use as a guide in formulating reaction products therefrom as these values provide a measure of the actual purity of each compound.

The analytical procedure used to determine amine equivalents of diisocyanates is found in Monsanto Chemical Company's Technical Bulletin #P-125 and is generally as follows:

Twenty-five milliliters of redistilled toluene and 25 ml. of approximately 2 N di-n-butylamine were placed in a carefully cleaned and dried 250 ml. or 500 ml. Erlenmeyer flask. The sample of diisocyanate was drawn into a warmed glass bulb and the neck sealed off in a flame. Sample weight is determined by the difference in weight between the empty and the filled bulb. The bulb was immersed in the Erlenmeyer flask and crushed beneath the surface of the liquid. The solution was heated to boiling and allowed to cool 1 hour. 100 ml. of technical methanol and 0.5 ml. of bromophenol blue indicator was added. It was then titrated with 1 N HCl to a yellow end point. The indicator was prepared by taking 0.1 g. of bromophenol blue, 1.5 ml. of 0.1 N NaOH diluted with 100 ml. of distilled $H_2O$. The average precision demonstrated by these determinations was ±1.29%.

The following examples, presented in tabular form to conserve space, illustrate the conversion of mixtures of Diphenolic Acid and polyisocyanates alone and modified with a monoisocyanate to insoluble, infusible products. Each of the Diphenolic Acids was dissolved in the designated solvent to a non-volatiles content of 40-60%. The isocyanates were used in most examples at 100% non-volatiles content. The mixtures thus obtained were applied to glass panels at .002″ wet film thickness. The table gives the heat treatment used for conversion and indication of film flexibility and water and alkali resistance in actual applications. All parts are by weight.

structure in accordance with the invention, the following example was prepared:

*Example XV*

191 parts DPA, 18 parts water, 19 parts of polyoxyethylene sorbitan mono-oleate, an emulsifier sold under the trade-name Tween 80 by Atlas Powder Company, and 1.8 parts of triethylamine were stirred in an open container to a homogeneous mixture. 272 parts of methylene bis-2,4-diisocyanate were added, following which the mixture was heated, with continuous stirring, to 100° C., and allowed to foam freely. The reaction occurs instantaneously and solidification is complete within a short time, although heating is continued for about 5 minutes merely to insure that a complete cure has been obtained. The result is a rigid brittle foam having small cells of generally uniform size dispersed throughout.

The aforegoing examples are furnished only for the guidance of those seeking to practice the invention and not for the purpose of defining the boundaries within which it is operative. Numerous other embodiments are possible and will be suggested by these few illustrations.

Having thus described the invention, that which is claimed is:

1. A composition of matter comprising the polymeric reaction product of a mixture in which the sole polymer forming ingredients are (A) a compound of the general formula $R(NCX)_z$ wherein R is an organic radical having a valency equal to z X is a chalcogen having an atomic weight of less than 33 and z is an integer having a value of more than 1 and (B) a pentanoic acid consisting essentially of 4,4 bis(4-hydroxyaryl) pentanoic acid wherein the hydroxyaryl radical is a hydroxyphenyl radical and is free from substituents other than alkyl groups of from 1-5 carbon atoms, wherein the reactive functional groups of (A) and (B) are present in an equivalent ratio of from about 5:1 to 1:5.

2. The composition of matter of claim 1 where the pentanoic acid of (B) consists essentially of 4,4 bis(4-hydroxyaryl)pentanoic acid wherein the hydroxyaryl radi-

TABLE II.—EXAMPLES OF THE INVENTION AS A COATING

| Ex. No. | Diphenolic acid | Parts | Polyisocyanate | Parts | Monoisocyanate | Parts | Triethylamine, parts | Solvent | Conversion Time (hrs.) | Conversion Temp., °C. | Film properties | Withstood in hrs. $H_2O$ at 100° C. | Withstood in hrs. 5% aq. NaOH at 25° C |
|---|---|---|---|---|---|---|---|---|---|---|---|---|---|
| I | DPA¹ | 143 | HY T | 272 | | | 1.84 | MIK² | 0.08 | 100 | Brittle | 4+ | 0.75 |
| II | DPA¹ | 269 | HY T | 181 | MO O | 342 | | MIK² | 0.5 | 175 | do | 0.25 | 0.17 |
| III | DPA¹ | 269 | HY T | 269 | MO O | 342 | | MIK² | 1.0 | 150 | do | 3.0 | 0.75 |
| IV | DPA¹ | 143 | HY M | 280 | | | | MIK² | 0.5 | 150 | do | 12+ | 104+ |
| V | DPA¹ | 143 | HY M | 420 | | | | MIK² | 0.4 | 150 | do | 12+ | 104+ |
| VI | DPA¹ | 54 | HY M | 56 | | | | MIK² | 0.5 | 175 | Flexible | 16+ | 24+ |
| VII | DPA¹ | 54 | HY M | 49 | MO O | 49 | | MIK² | 0.5 | 175 | Brittle | 1.25 | 5 |
| VIII | DPA¹ | 445 | HY M | 280 | MO O | 342 | | MIK² | 1.0 | 150 | do | 0.17 | 0.17 |
| IX | DPA¹ | 143 | N 200 | 199 | | | | MIK² | 0.08 | 150 | do | 0.25 | 0.08 |
| X | DPA¹ | 54 | N 200 | 46 | MO O | 86 | | MIK² | 0.5 | 175 | do | 0.25 | 3.0 |
| XI | DPA¹ | 54 | MO N5 | 41 | MO O | 86 | | MIK² | 1.0 | 175 | do | 0.17 | 0.17 |
| XII | DPA¹ | 54 | MO TM | 188 | MO O | 86 | | MIK² | 0.5 | 175 | do | 0.17 | 0.17 |
| XIII | DPA¹ | 54 | MO HX | 36 | MO O | 86 | | MIK² | 1.0 | 175 | Flexible | 12.0 | 0.17 |
| XIV | DPA¹ | 54 | Dur | 39 | MO O | 86 | | MIK² | 1.0 | 175 | do | 0.17 | 0.17 |

¹ DPA represents 4,4 bis-(4-hydroxyphenyl) pentanoic acid, the condensation product of phenol and levulinic acid.
² MIK represents methyl isobutyl ketone.

It will be understood that the description of flexibility is purely relative and indicates merely whether or not a substantial part of the film could be peeled or stripped intact from the panel. Varying degrees of flexibility or brittleness are encompassed by the general descriptive terms used. Products which might be too brittle for use on film wherein considerable flexibility was a requistite would nevertheless be useful in films where flexibility is of no importance or in cast or molded articles.

In order to demonstrate the preparation of a foam resin cal is a hydroxyphenyl radical and is free from substituents other than alkyl groups of one carbon atom.

3. The composition of matter of claim 1 wherein the pentanoic acid of (B) is 4,4 bis(4-hydroxyphenyl) pentanoic acid.

4. The composition of matter of claim 3 wherein the reactive functional groups of (A) and (B) are present in an equivalent ratio of from about 2:1 to 1:2.

5. The composition of matter as described in claim 4 wherein R of (A) is an organic aromatic radical.

6. The composition of matter as described in claim 4 wherein R of (A) is an organic aliphatic radical.

7. A method of preparing a new polymeric composition of matter which comprises admixing a mixture in which the sole polymer forming ingredients are (A) a compound of the general formula $R(NCX)_z$, wherein R is an organic radical having a valency equal to $z$, X is a chalcogen having an atomic weight of less than 33 and $z$ is an integer having a value of more than 1 and (B) a pentanoic acid consisting essentially of 4,4 bis(4-hydroxyaryl)pentanoic acid wherein the hydroxyaryl radical is a hydroxyphenyl radical and is free from substituents other than alkyl groups of from 1–5 carbon atoms, wherein the reactive functional groups of (A) and (B) are present on an equivalent ratio of from about 5:1 to 1:5, and heat converting said mixture to an insoluble, infusible resin.

References Cited in the file of this patent

UNITED STATES PATENTS

| | | |
|---|---|---|
| 2,284,896 | Hanford et al. | June 2, 1942 |

FOREIGN PATENTS

| | | |
|---|---|---|
| 901,768 | France | Aug. 6, 1945 |

OTHER REFERENCES

De Bell et al.: "German Plastics Practice," copyright 1946; pages 463–465. Copy in Scientific Library.

Bader et al.: "Journal of the Am. Chem. Soc.," volume 76, pages 4465 and 4466, September 1954. Copy in Scientific Library.

UNITED STATES PATENT OFFICE

CERTIFICATE OF CORRECTION

Patent No. 2,907,746                                            October 6, 1959

Sylvan O. Greenlee

It is hereby certified that error appears in the printed specification of the above numbered patent requiring correction and that the said Letters Patent should read as corrected below.

Columns 9 and 10, Table II, second column thereof, in the heading, lines 1 and 2, for "Diphenolic acid" read --Diphenolic Acid--; column 10, line 30, for "z X" read -- z, X --.

Signed and sealed this 9th day of August 1960.

(SEAL)
Attest:

KARL H. AXLINE                                                  ROBERT C. WATSON
Attesting Officer                                          Commissioner of Patents